United States Patent
Ban et al.

[11] Patent Number: 6,024,927
[45] Date of Patent: Feb. 15, 2000

[54] PARTICULATE TRAP

[75] Inventors: Shunsuke Ban; Takao Maeda; Hiroshi Yoshino; Tsutomu Ooka, all of Itami, Japan

[73] Assignee: Sumitomo Electric Industries, Ltd., Osaka, Japan

[21] Appl. No.: 08/177,391

[22] Filed: Jan. 5, 1994

[30] Foreign Application Priority Data

Jan. 6, 1993 [JP] Japan ................................. 5-000735
Nov. 19, 1993 [JP] Japan ................................. 5-290792

[51] Int. Cl.⁷ ............................................. F01N 3/10
[52] U.S. Cl. ........................ 422/174; 422/171; 422/178; 55/DIG. 10; 55/DIG. 30; 60/303; 60/311
[58] Field of Search .................... 422/174, 178, 422/171; 55/523, DIG. 10, DIG. 30; 60/303, 311

[56] References Cited

U.S. PATENT DOCUMENTS

| | | | |
|---|---|---|---|
| 2,220,641 | 11/1940 | Davis .................................... | 55/523 |
| 3,892,536 | 7/1975 | Roeser et al. ......................... | 422/169 |
| 4,276,066 | 6/1981 | Bly et al. .............................. | 422/178 |
| 4,390,355 | 6/1983 | Hammond, Jr. et al. ............... | 55/523 |
| 4,548,625 | 10/1985 | Ishida et al. .......................... | 422/178 |
| 4,629,483 | 12/1986 | Stanton ................................. | 55/523 |
| 4,881,959 | 11/1989 | Kono et al. ............................ | 55/523 |
| 4,897,096 | 1/1990 | Pischinger et al. .................... | 55/523 |
| 4,988,372 | 1/1991 | Meline .................................. | 55/523 |
| 5,084,080 | 1/1992 | Hirase et al. .......................... | 422/174 |
| 5,171,337 | 12/1992 | Pollock ................................. | 55/523 |
| 5,195,319 | 3/1993 | Stobbe .................................. | 55/523 |
| 5,258,164 | 11/1993 | Bloom et al. ......................... | 422/174 |

FOREIGN PATENT DOCUMENTS

| | | | |
|---|---|---|---|
| 0532986 | 3/1993 | European Pat. Off. . | |
| 2600907 | 7/1987 | France . | |
| 4012719 | 10/1991 | Germany . | |
| WO17691 | 10/1992 | WIPO ................. | 422/174 |

Primary Examiner—Hien Tran
Attorney, Agent, or Firm—Wenderoth, Lind & Ponack, L.L.P.

[57] ABSTRACT

A particulate trap for use in a diesel engine can efficiently trap particulates contained in exhaust gas with low pressure drop and can burn collected particulates for regeneration with less power consumption. A filter element having a built-in electric heater is mounted in a case provided in the exhaust line of a diesel engine. The filter has two mutually opposed surfaces between which is mounted the electric heater. With this arrangement, it is possible to increase the filtration area and also the heating efficiency.

7 Claims, 8 Drawing Sheets

| Elapsed time | 5 minutes | 7.5 minutes | 15 minutes |
|---|---|---|---|
| Specimen A | 80 % | 95 % | 100 % |
| Specimen B | 30 % | 75 % | 100 % |

| Elapsed time | 5 minutes | 7.5 minutes | 15 minutes |
|---|---|---|---|
| Specimen C | 85 % | 100 % | 100 % |
| Specimen D | 40 % | 80 % | 100 % |

FIG. 15

| Elapsed time | 5 minutes | 7.5 minutes | 15 minutes |
|---|---|---|---|
| Specimen E | 85 % | 100 % | 100 % |
| Specimen F | 35 % | 80 % | 100 % |

PARTICULATE TRAP

BACKGROUND OF THE INVENTION

This invention relates to a particulate trap for collecting and removing particulates such as carbon contained in exhaust gas discharged from a diesel engine.

Exhaust gas discharged from cars is a major cause of air pollution. It is very important to develop techniques for removing harmful components contained in the exhaust gas. It is especially important to develop techniques for removing particulates in the exhaust gas discharged from diesel engines, which contain ΔNOx and carbon.

Heretofore, various efforts have been made to remove such harmful components from the exhaust gas. Such efforts include putting EGR (exhaust gas recirculation) on the engine and improving the fuel injection system. However, none of these efforts has been a decisive solution. Another known measure is to provide an exhaust trap in the exhaust passage to collect the particulates in the exhaust gas (as proposed in Unexamined Japanese Patent Publication 58-51235). This after-treatment method is considered the most practical and has been studied vigorously.

A particulate trap for collecting particulates contained in the exhaust gas has to meet the following requirements in view of the conditions of use:

1) Collecting Capacity

First, it has to be capable of collecting particulates with such high efficiency that the exhaust gas is cleaned sufficiently. The amount of particulates contained in the exhaust gas depends on the displacement of the diesel engine and the load applied. It is generally considered that such a trap has to be capable of collecting at least 60% of the particulates in the exhaust gas.

2) Pressure Drop

Secondly, such a trap must not unduly prevent the flow of exhaust gas. As the amount of the particulates collected by the trap increases, the pressure drop increases gradually. If such pressure drop is too high, an undesirable back pressure will act on the engine. It is considered necessary to keep such pressure drop below 30 KPa. For this purpose, it is necessary to use a particulate trap which is low not only in initial pressure drop but also keeps the pressure drop low even after it has collected particulates.

3) Regeneration

Thirdly, such a trap has to permit regeneration without requiring much energy. In other words, the trap has to have means for burning the collected particulates to regenerate it. One conceivable device for burning particulates is a light oil burner. However, considering the safety and ease of control, an electric heater is considered more promising. The trap has to be regenerated without consuming too much electric power because the capacity of a battery on a car is limited.

A wall-flow type honeycomb-shaped porous member made of cordierite ceramic is considered most practical as the filter element material in the particulate trap. However, with this type of filter, particulates tend to collect in a limited area. Further, due to low heat conductivity of cordierite ceramic, heat spots tend to develop when burning particulates. Thus, the filter may melt or develop cracks due to thermal stress. Such a filter is therefore not reliable enough.

Much attention is now directed to a metal trap and a ceramic fiber trap comprising candle-shaped ceramic fibers, because these traps never develop cracks and thus are sufficiently reliable.

Such traps have a structural problem in that their filtration area through which exhaust gas can pass is small compared with a cordierite ceramic filter. If the filter is designed so as to exhibit increased particulate collection efficiency, the particulates will be collected only on the surface of the filter, thus clogging it. The clogged filter will sharply increase the pressure drop. Thus, the life of such a filter is very short.

These filters have another disadvantage which is observed when burning particulates to regenerate them. Namely, whereas a cordierite ceramic filter can burn particulates with less power consumption because it heats itself up while burning the collected particulates and the heat thus generated is propagated to the particulates, metal traps and ceramic fiber traps cannot collect as much particulates as the cordierite ceramic filter and thus they are not heated to a sufficient degree. This means that the particulates have to be burned practically solely by the heat produced by the electric heater. Thus, the electric heater consumes much electric power.

SUMMARY OF THE INVENTION

An object of the present invention is to provide a particulate trap which solves these problems.

According to the present invention, an electric heater for burning particulates is interposed between the opposed surfaces of the filter elements.

The distance between the heater and the filter element should preferably be 20 mm or less.

Also, it is preferable to form the filter element from at least two different kinds of filter materials whose pore diameters are different from one another so that the material having large-diameter pores is arranged nearer to the exhaust gas inlet side than the material having small-diameter pores. This makes it possible to prolong the pressure drop life of the filter element, reduce its weight and heat capacity and thus allows it to regenerate in a shorter period of time.

The filter element should preferably be made of a three-dimensional mesh-like porous metal member, an unwoven metal web or a three-dimensional mesh-like porous metal member having its pores stuffed with ceramics or metal to reduce their diameter.

The above-mentioned filter materials, i.e. the three-dimensional mesh-like porous metal member (A), an unwoven metal web (B), and the three-dimensional mesh-like porous metal member having its pores stuffed with ceramics or metal to reduce their diameter (C), are used in combination so that the material having larger-diameter pores is arranged nearer to the exhaust gas inlet side than the material having smaller-diameter pores. They can be combined in the following manner:

(1) A+A, (2) B+B, (3) C+C, (4) A+B, (5) A+C, (6) B+C, (7) A+B+C

By interposing the electric heater between the opposed surfaces of the filter element, it is possible to increase the filtration area of the filter through which exhaust gas can pass compared with a conventional filter having a candle structure. Thus, the filter element of the present invention shows a prolonged pressure drop life.

Further, with this arrangement, since the heat produced by the electric heater is confined in a narrow space between the opposed surfaces of the filter, the collected particulates can be heated efficiently. Thus, the electric heater consumes less electric power for regeneration.

Further, since the filter element is arranged so that its pores nearer to the exhaust gas inlet side have larger diameters than those nearer to the outlet side, particulates can be collected uniformly over the entire area of the filter in the direction of thickness. The filter is thus less likely to clog. This leads to a prolonged pressure drop life and a lighter filter weight and thus a shorter regeneration time. Shorter regeneration time means less electric power consumption.

The particulate trap of the present invention has its electric heater for burning collected particulates interposed between the opposed surfaces of the filter element so as not to interfere with the flow of exhaust gas. Thus, the collected particulates will not increase the pressure drop of the filter, so that its particulate collection capacity is kept high for a prolonged period of time.

Also, the particulates can be burned efficiently by the electric heater with less electric power consumption. This invention is therefore especially suitable for application to diesel engine cars for which there is a growing demand for measures to clean their exhaust gas and the battery capacity is limited.

BRIEF DESCRIPTION OF THE DRAWING

Other features and objects of the present invention will become apparent from the following description made with reference to the accompanying drawings, in which:

FIG. 15 is a table showing the recovery rate of the pressure drop when particulates are burned at a heater power of 700 W in the third embodiment.

DETAILED DESCRIPTION OF THE PREFERRED EMBODIMENT

Figure 1:
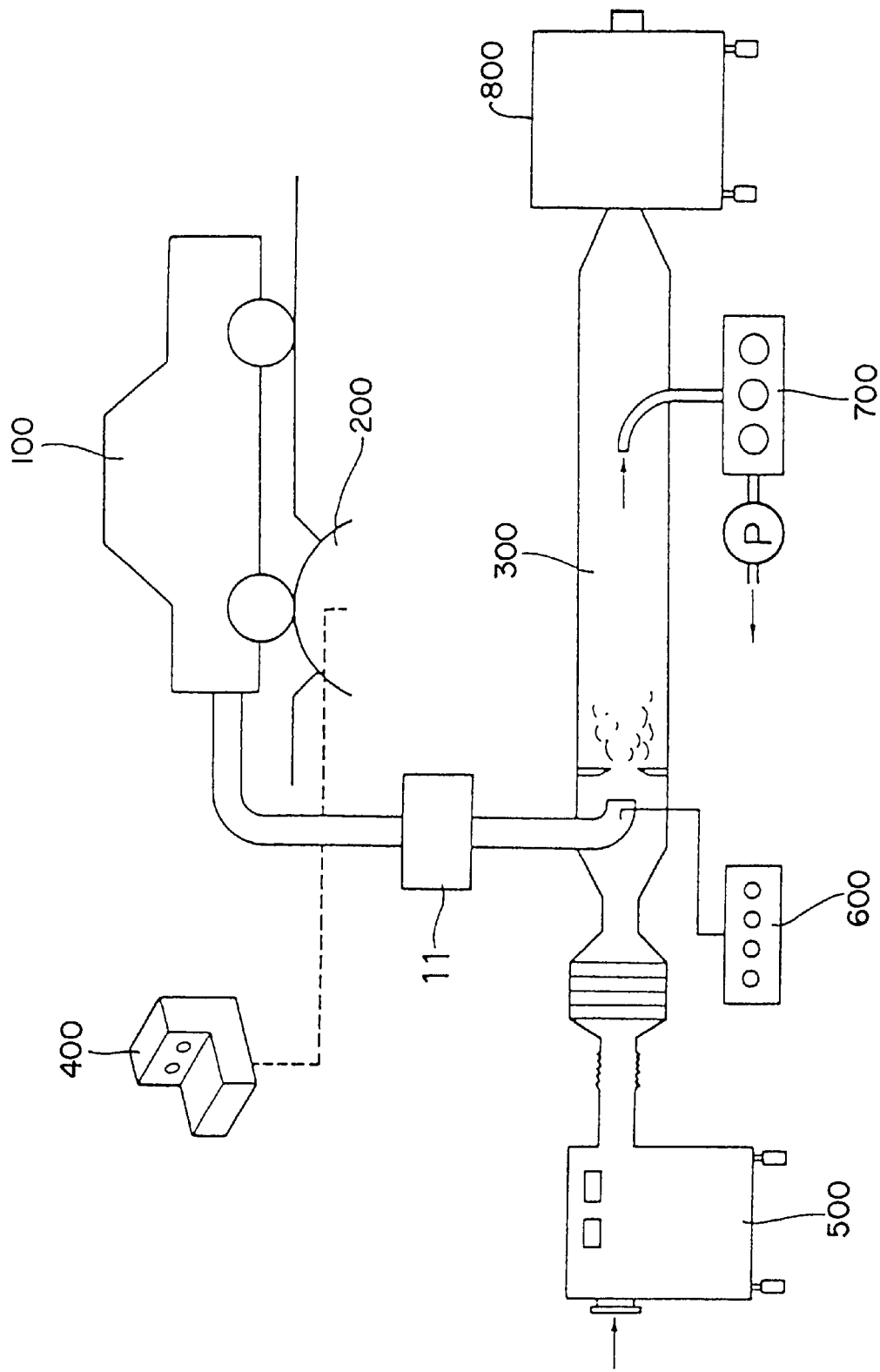
FIG. 1 is a schematic view of an experimental device used for the evaluation of particulate collection capacity.

FIG. 1 shows an apparatus for experiment. It comprises a 3400 cc, four-cylinder, direct-injection diesel engine car 100, a chassis dynamometer 200, a dilution tunnel 300, a controller 400, a diluted air temperature controller 500, an exhaust thermometer 600, an exhaust concentration meter 700, and a blower 800.

(First Embodiment)

Figure 2:
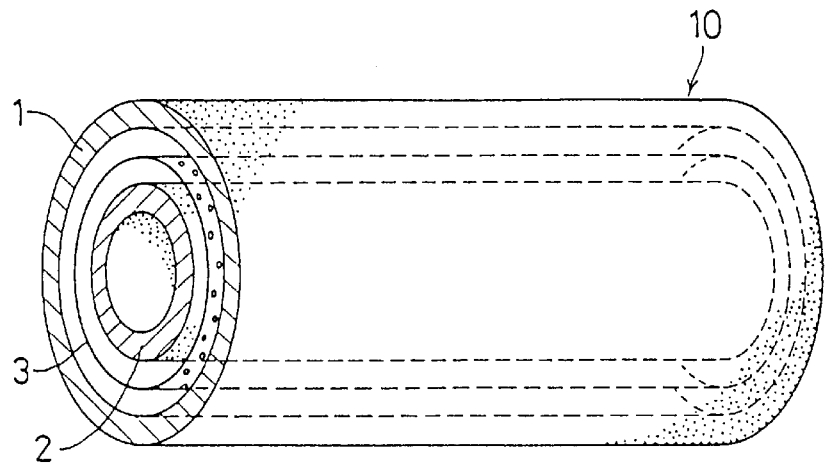
FIG. 2 is a perspective view of a main component (filter element with a built-in heater) of the particulate trap of the present invention.

FIG. 2 shows the first embodiment of the particulate trap for use in a diesel engine according to the present invention. It comprises cylindrical filters 1 and 2 having different diameters and nested together and an electric heater 3 disposed therebetween. This filter element 10 with a built-in heater is mounted in a case 11 shown in FIG. 1.

Figure 3:
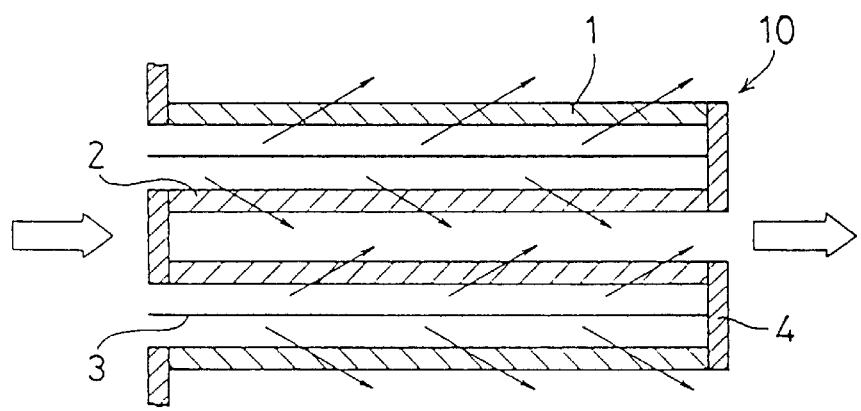
FIG. 3 is a sectional view of the filter element shown in FIG. 2.

FIG. 3 is a sectional view of the filter element 10 shown in FIG. 2. Exhaust gas is introduced inbetween the filters 1, 2. Part of the gas flows through the filter 1 to its outside and the remaining part flows through the filter 2 into its inside. In order to create this gas flow, the gas inlet side and the opposite end face are sealed by iron plates 4 through gaskets.

The filters in this embodiment were cylindrical members formed by adding Cr to a Ni-based three-dimensional mesh-like porous member (trade name: CERMET) made by Sumitomo Electric Industries, Ltd. The heater 3 comprises a cylindrical member made of punching metal and a sheath heater 4 mm in diameter wound around the cylindrical member.

Experiments were conducted using a particulate trap (specimen A) having eight of the filter elements 10 shown in FIG. 2 mounted in a case.

Figure 4:
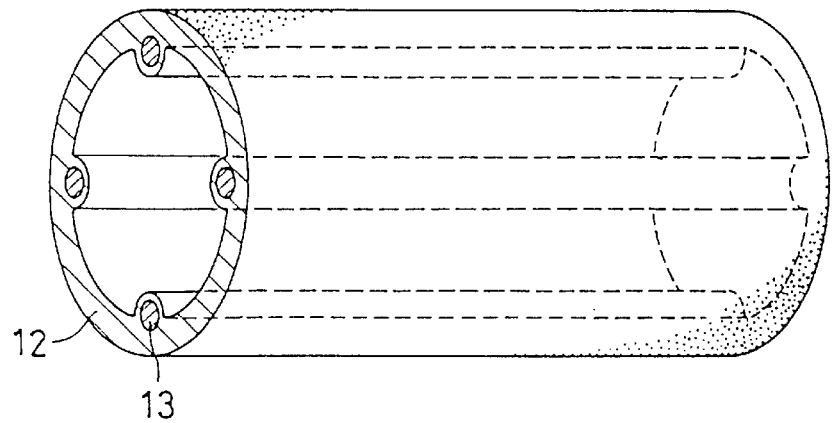
FIG. 4 is a perspective view of a conventional heater-carrying filter element.

For comparison purposes, experiments were also carried out on a trap having a cylindrical structure (specimen B) shown in FIG. 4, which is employed in ordinary metal traps and ceramic fiber traps. The specimen B comprises seven filter elements mounted in a case, each element comprising a filter 12 made of the same material as the specimen A and four sheath heaters 13 arranged at pitch of 90°.

Table 1 shows the specifications of the specimens A and B such as dimensions.

TABLE 1

| Specimen | CERMET No. | Thickness of material (CERMET) | No. of turns | Material | Size | No. of filter elements | Packing density |
|---|---|---|---|---|---|---|---|
| A | #7 | 0.9 mm | 4 | NiCr | Filter 1: φ48 × φ39 × 190 L<br>Filter 2: φ29 × φ27 × 190 L | 7 | 21.1% |
| B | #7 | 0.9 mm | 4 | NiCr | φ48 × φ39 × 190 L | 7 | 21.2% |

A: according to the present invention
B: for comparison

The item numbers in the table show the number of cells (or pores) in a unit area. #7 has 50–70 cells per inch.

Figure 7:
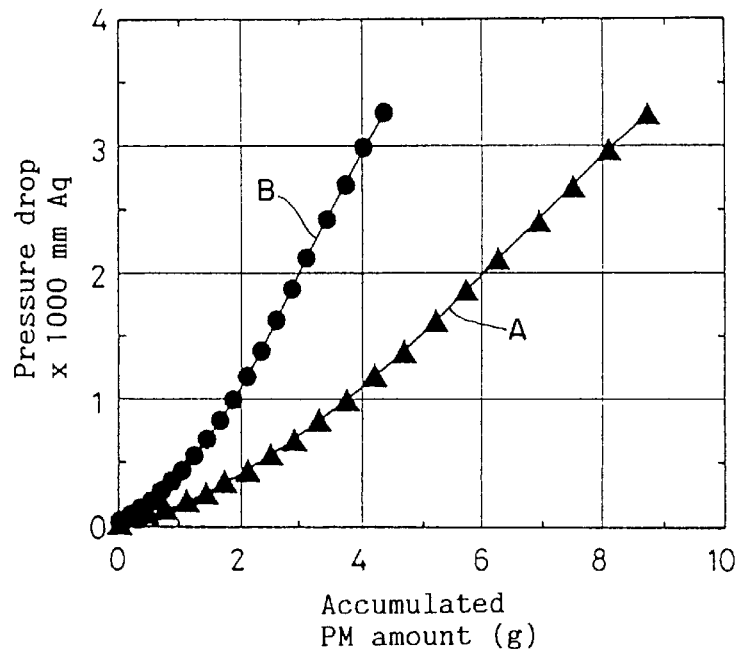
FIG. 7 is a graph showing the relation between the pressure drop and the accumulated PM (particulate matter) amount.
Figure 8:
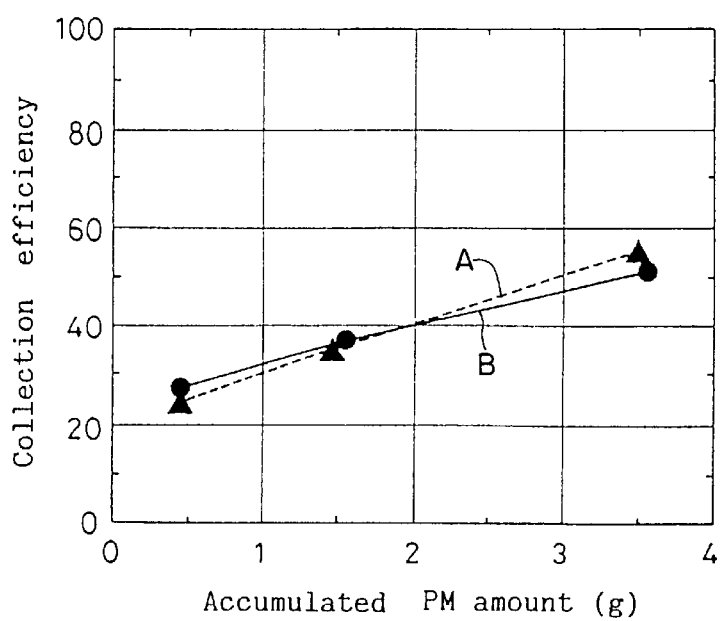
FIG. 8 is a graph showing the relation between the particulate collection efficiency and the accumulated PM amount.

The results of experiments are shown in FIGS. 7 and 8. The particulate collection capacity of each specimen is represented in terms of the pressure drop and the collection efficiency with respect to accumulated PM amount (amount of particulates). The regeneration is shown in terms of the recovery rate of the pressure drop when the heater power is applied.

These results clearly show that the particulate trap according to the present invention (specimen A) shows an extended pressure drop life and requires less electric power for regeneration.

In the embodiment, a punching metal was heated by the sheath heater to uniformly heat all of the surfaces of the filters by the radiating heat from the punching metal. But the heating medium is not limited to punching metal. It may be expanded metal or an ordinary wire net or porous metal.

It is preferable to use a plate-shaped heater in order to heat the filters uniformly. However, this is not an essential requirement. For example, a rod-shaped sheath heater may be interposed between the opposed surfaces of the filters. Moreover, the heater 3 may be in contact with one or both of the opposed surfaces of the filters. The only requirement be that the heater is disposed between the opposed surfaces in such a way as not to interfere with the flow of exhaust gas.

(Second Embodiment)

The experimental apparatus shown in FIG. 1 was used here, too.

The particulate trap of the second embodiment (specimen C) has the same structure as the one shown in FIG. 2 (its section is the same as shown in FIG. 3) but differs therefrom in that the filters are cylindrical members formed from an unwoven web of metal fibers. In the embodiment, the unwoven metal web is of an Fe—Cr—Al alloy but may be made of any other material.

The heater is formed by stamping a thin plate of inconel and shaping it into a tube after adjusting its resistance. It is heated by directly supplying electricity thereto. Of course, the heater may be made of a material other than inconel.

Experiments were conducted for seven sets of the above-described filter elements mounted in a case and each comprising concentrically arranged filters 1, 2 of an unwoven metal web and a cylindrical heater 3 made of inconel and disposed therebetween.

For comparison purposes, experiments were also carried out trap having a cylindrical structure (specimen D) shown in FIG. 4, which is employed in ordinary metal traps and ceramic fiber traps. This comparative specimen D comprises seven filter elements mounted in a case, each element comprising a cylindrical filter 12 made of an unwoven metal web and four rod-shaped heaters 13 mounted in the filter as shown.

Table 2 shows the specifications of the specimens C and D such as dimensions.

Figures 9, 10:
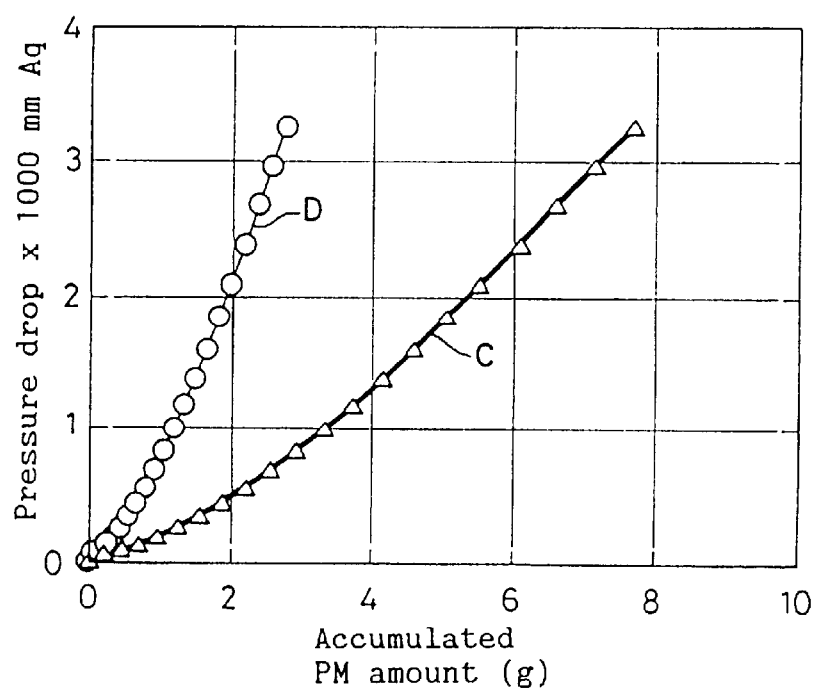
FIG. 9 is a table showing the recovery rate of the pressure drop when particulates are burned at a heater power of 700 W.
FIG. 10 is a graph similar to the graph of FIG. 7 for the second embodiment.
Figures 11, 12:
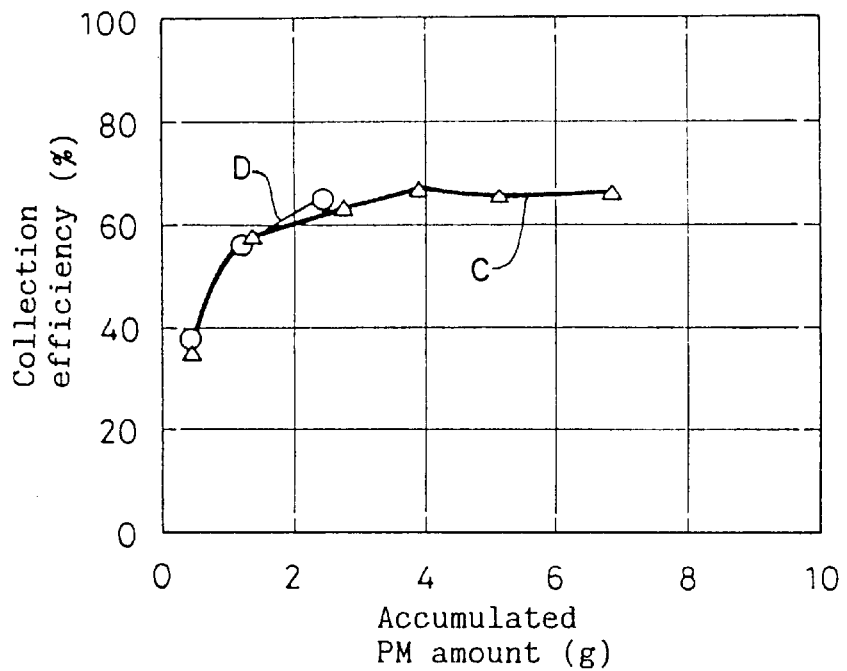
FIG. 11 is a graph similar to the graph of FIG. 8 for the second embodiment.
FIG. 12 is a table showing the recovery rate of the pressure drop when particulates are burned at a heater power of 700 W in the second embodiment.

The results of experiments are shown in FIGS. 10–12. The particulate collection capacity of each specimen is represented in terms of the pressure drop and collection efficiency with respect to accumulated PM amount. The regeneration capacity is shown in terms of the recovery rate of the pressure drop when the heater power is applied. These results clearly show that the specimen C according to the present invention shows an extended pressure drop life and requires less electric power for regeneration.

(Third Embodiment)

The experimental apparatus used here is also the same as the apparatus shown in FIG. 1.

Figure 5:
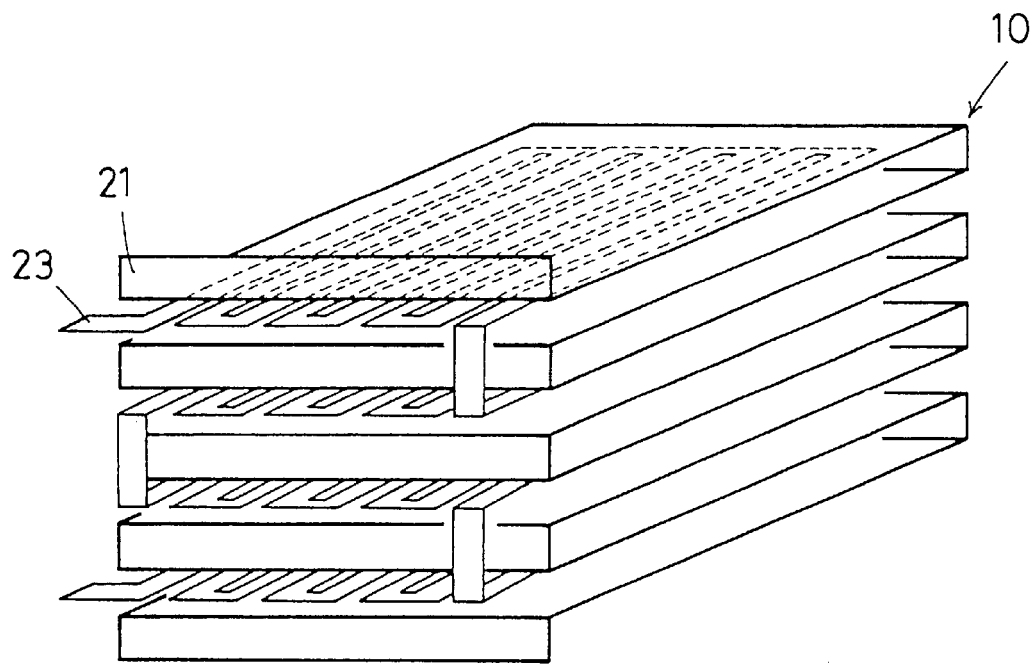
FIG. 5 is a prespective view of another embodiment 0f a filter element of a particulate trap.
Figure 6:
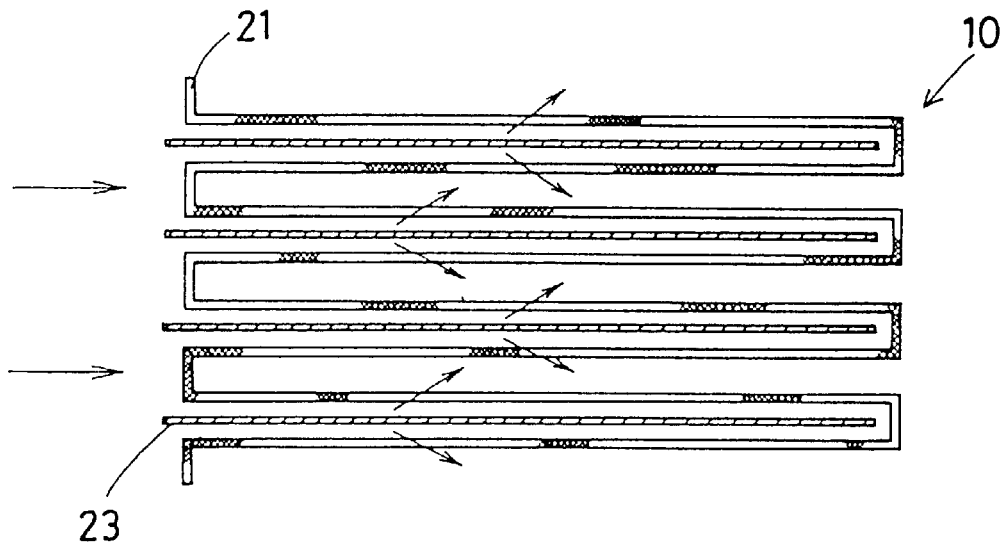
FIG. 6 is a sectional view of the filter element shown in FIG. 5.

The specimen of the third embodiment (specimen E) is a filter element 10 shown in FIG. 6 (its section is shown in FIG. 5). This filter element comprises a web of filter plate 21 which is folded over many times to provide a plurality of layers and a plurality of plate heaters 23 disposed between the layers. As shown in FIG. 5, exhaust gas is introduced into the gaps defined between the adjacent layers of the filter plate 21. In order to allow the exhaust gas to flow through the filter plate 21, its sides are sealed by iron plates (not shown).

The third embodiment of the filter element used as the particulate trap is made of an unwoven web of metal fibers whose diameter decreases gradually from its exhaust gas inlet towards its outlet so that the pores nearer to the inlet have larger diameters than those nearer to the outlet. The unwoven metal web is made of a Ni—Cr—Al alloy in the embodiment but may be made of any other material.

The plate-shaped heaters 23 are formed by blanking an inconel thin plate and adjusting its resistance. The heaters may be made of a material other than inconel. They may comprise a plate of punching metal and heater wires attached thereto.

The filter element of this embodiment was mounted in a trap case to form the particulate trap of the present invention (specimen E). Its performance was evaluated.

For comparison purposes, a conventional trap having a cylindrical configuration as shown in FIG. 6 (specimen F) was also tested. The specimen F comprises a cylindrical filter made of the same material as the specimen E and four rod-shaped heaters mounted thereto.

Table 3 shows data on the specimens E and F such as dimensions.

TABLE 2

| Specimen | Fiber diameter of metal unwoven web | Thickness of material (metal unwoven web) | No. of turn | Material | Size | No. of filter elements | Packing density |
|---|---|---|---|---|---|---|---|
| C | 30 μm | 0.5 mm | 2 | FeCrAl | Filter 1: φ62 × φ60 × 190 L<br>Filter 2: φ50 × φ48 × 190 L | 7 | 20.0% |
| D | 30 μm | 0.5 mm | 2 | FeCrAl | φ57 × φ55 × 190 L | 7 | 20.0% |

C: according to the present invention
D: for comparison

TABLE 3

| Specimen | Fiber diameter of metal unwoven web | Thickness of material (metal unwoven web) | Material | Shape of filter | Size | No. of filter elements | Packing density |
|---|---|---|---|---|---|---|---|
| E | 40 μm at exhaust inlet<br>20 μm at exhaust outlet | Total 1.0 mm | NiCrAl | Parallel plane plate | Filter contour:<br>W 130 × H 130 × D 190 | 1 | 20.0% |
| F | 40 μm at exhaust inlet<br>20 μm at exhaust outlet | Total 1.0 mm | NiCrAl | Cylindrical | φ57 × φ55 × 190 L | 7 | 20.0% |

E: according to the present invention
F: for comparison

Figure 13:
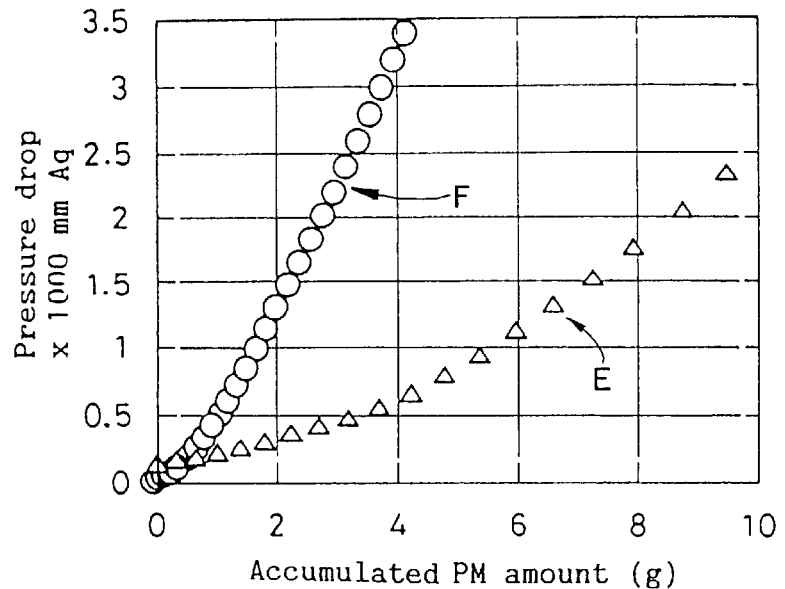
FIG. 13 is a graph similar to the graph of FIG. 7 for the third embodiment.
Figure 14:
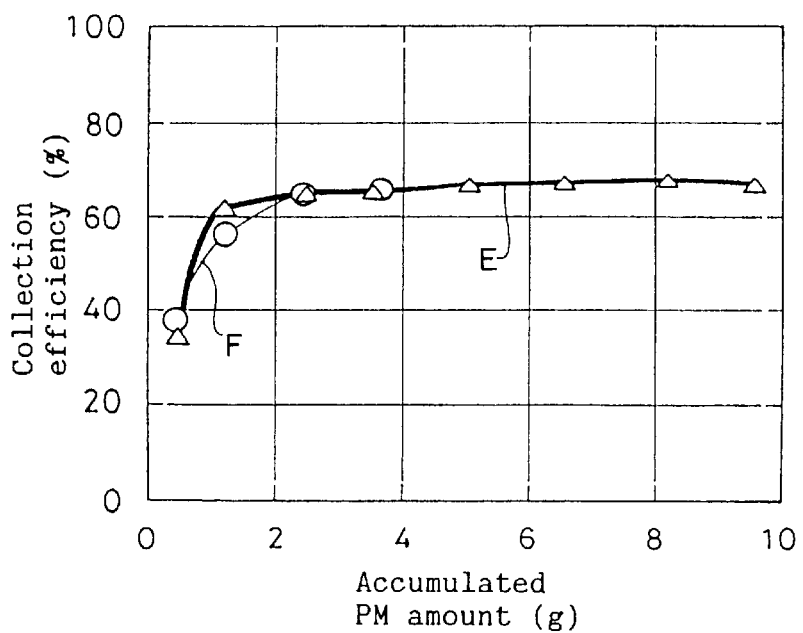
FIG. 14 is a graph similar to the graph of FIG. 8 for the third embodiment.

The results of experiments are shown in FIGS. 13–15. The particulate collection capacity of each specimen is represented in terms of the pressure drop and collection efficiency with respect to accumulated PM amount. The regeneration capacity is shown in terms of the pressure recovery rate when the heater power is applied. These results clearly show that the specimen E according to the present invention shows an extended pressure drop life and requires less electric power for regeneration.

What is claimed is:

1. A particulate trap for filtering particulates in exhaust gas of a diesel engine, said trap comprising: a case provided in an exhaust line of the diesel engine; a filter element disposed in said case, said filter element comprising a filter of porous metal forming a three-dimensional mesh, the porous metal of said filter element defining two opposing surfaces defining a space therebetween open to the exhaust line such that exhaust gas from the diesel engine enters the space between said opposing surfaces and from said space into the filter past said surfaces; and an electric heater in the form of a plate having two surfaces at opposite sides thereof, said heater being interposed between said opposing surfaces of said filter with said surfaces of the heater facing directly opposite and spaced, but not more than 20 mm, from said opposing surfaces of said porous metal, respectively, whereby said heater will burn particulate matter trapped by said filter element at said opposing surfaces.

2. A particulate trap as claimed in claim 1, wherein said filter element comprises two cylindrical members having different inner and outer diameters from one another, one of said cylindrical members being located within the other of the cylindrical members, and said heater being in the form of an annular plate interposed between said cylindrical members.

3. A particulate trap as claimed in claim 1, wherein said filter element includes ceramic occupying pores of said porous metal.

4. A particulate trap as claimed in claim 1, wherein said filter element includes metal occupying pores of said porous metal.

5. A particulate trap as claimed in claim 1, wherein the case has an inlet connected to said exhaust line so as to receive exhaust gas therefrom and an outlet from which filtered exhaust is discharged, and pores of the porous metal of said filter element closest to the inlet are larger than pores of the porous metal of said filter element closer to the outlet with respect to a direction of gas flow through the filter element.

6. A particulate trap for filtering particulates in exhaust gas of a diesel engine, said trap comprising: a case provided in an exhaust line of the diesel engine; a filter element disposed in said case, said filter element comprising a filter of a non-woven web of metal, the non-woven metal web of said filter element defining two opposing surfaces defining a space therebetween open to the exhaust line such that exhaust gas from the diesel engine enters the space between said opposing surfaces and from said space into the filter past said surfaces; and an electric heater in the form of a plate having two surfaces at opposite sides thereof, said heater being interposed between said opposing surfaces of said filter with said surfaces of the heater facing directly opposite and spaced, but not more than 20 mm, from said opposing surfaces of said non-woven metal web, respectively, whereby said heater will burn particulate matter trapped by said filter element at said opposing surfaces thereof.

7. A particulate trap as claimed in claim 6, wherein said filter element comprises two cylindrical members having different inner and outer diameters from one another, one of said cylindrical members being located within the other of the cylindrical members, and said heater being in the form of an annular plate interposed between said cylindrical members.

* * * * *